S. T. Skinner.
Plow.
No 73264    Patented Jan. 14, 1868.
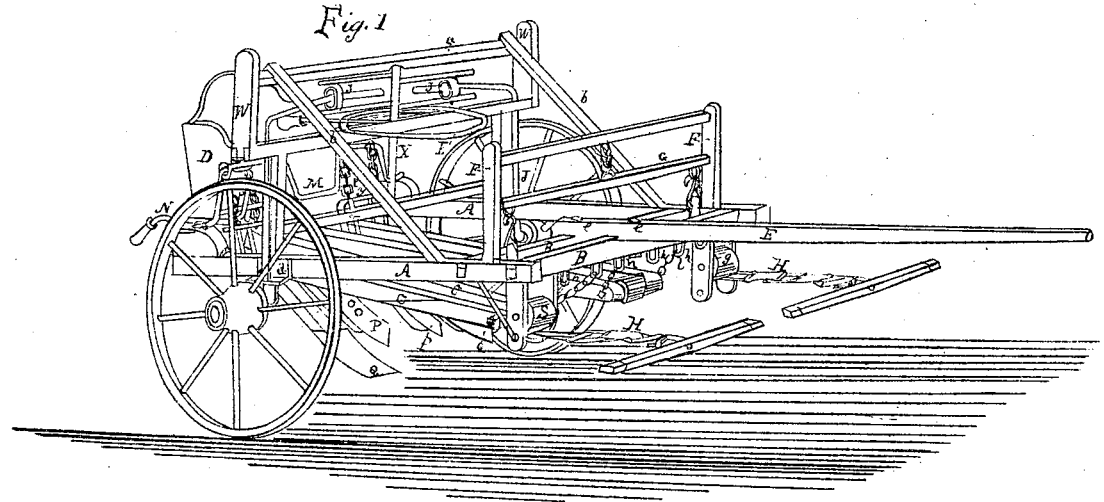
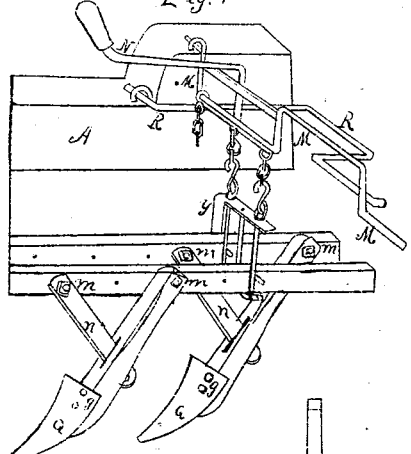
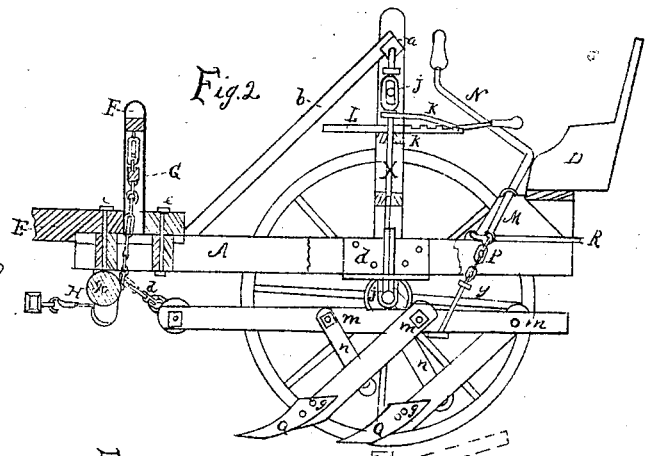
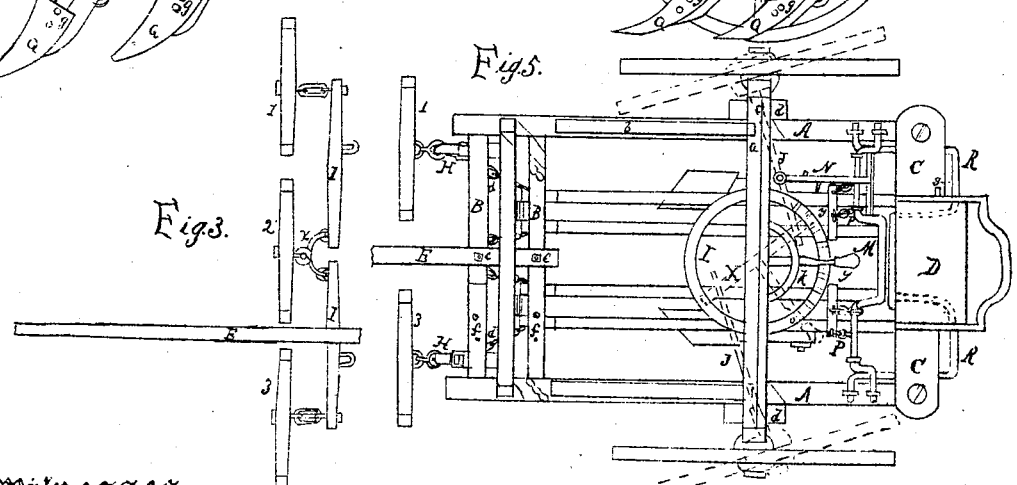
Witnesses
Chas. F. Wilson
Chas. H. Poole
Henry C. Dane
Attorney for Applicant

United States Patent Office.

STEPHEN T. SKINNER, OF JACKSONVILLE, MISSOURI.

Letters Patent No. 73,264, dated January 14, 1868.

IMPROVEMENT IN PLOUGHS.

The Schedule referred to in these Letters Patent and making part of the same.

TO ALL WHOM IT MAY CONCERN:

Be it known that I, STEPHEN T. SKINNER, of Jacksonville, Randolph county, State of Missouri, have invented a certain new and useful "Prairie-Breaking Plough and Cultivator;" and I do declare that the following is a full and exact description thereof, reference being had to the accompanying drawings, and to the letters of reference marked thereon.

To enable others skilled in the art to make and use my invention, I will proceed to describe its construction and operation.

Figure I represents a perspective view of my plough and cultivator.

Figure II is a bisectional representation of the plough and cultivator.

Figure III represents my triple whiffle-tree, which is used when the machine is used as a breaking-plough with three horses.

Figure IV is perspective view of a section with cultivator-blades hung for use.

Figure V is a top view of my machine, showing the working of my crank-axles and compound regulating-shaft, and my triple and double whiffle-trees, all combined.

I manufacture my machine as follows: I make a heavy wooden frame, as shown in Figs. I, II, and VI, of which A A are the sides, B B are the forward cross-beams, and C the rear cross-beam, which is made quite broad, and upon it is fastened the driver's seat D. E is the pole, which is bolted in the centre by bolts $e\ e$ when I use it as a cultivator, or as a "light plough," as shown in Fig. I, and it is bolted in the holes $f f$, near the left side, when used as a breaking-up plough, and when three horses are used, as represented in Fig. V. Over the front cross-beams, I put an upright frame, F, to which is hooked a swinging bar, G, to each end of which is attached a wide, flat chain, H H, which passes down and under rollers $g\ g$, fastened to the under side of the frame, and terminating with large hooks, to which I attach my triple whiffle-tree I I when I use the machine for "breaking up" with three horses, as shown in Fig. V, and to which I also attach my single whiffle-trees when I use it as a cultivator or top-plough with two horses, as shown in Fig. I. The wheels are attached to my "crank-axles" J J, which pass up through heavy iron plates $d\ d$, which are bolted to the sides of the frame A A, resting on shoulders under the said plates, then up through the middle beam of the upright frame W, then horizontally between the middle and top beams of frame W to my compound regulating-shaft X, into the revolving sockets $j\ j$, which hold them in place and position. To the regulating-shaft X is attached the spring-lever K, passing under the semicircle $k$, between two pins, and resting upon the full circle L, in the centre of which, in front of the driver, is a slot or catch, in which the lever rests when in the centre, and the wheels are running parallel with the machine.

By means of the spring-lever K the driver can guide the machine, and veer it to the right or left by moving the lever to the right or left, as shown in Fig. V, or, by leaving it in the catch, move directly ahead. The sockets $j\ j$, revolving, move up and down on the crank-axles as the regulating-shaft is turned by the driver.

The frame W, which is solely for the "crank-axles," is held in place and supported by two strong braces $b\ b$, bolted to the top bar $a$ and the sides A A. Beneath the frame are the ploughs. O O are the beams, P P the ploughshares, which are attached by bolts $m\ m$, and held in place by iron ties $n\ n$. To the forward ends of the beams are attached hooks, to which are hooked chains, $l\ l\ l\ l$, which also hook into eye-bolts $h\ h\ h\ h$ in the under side of cross-beam B. The width of the furrow is gauged by hooking the chains $d\ d\ d\ d$ to the right or left, at pleasure. Pendent to the rear end of the machine is an iron swinging bar, R, upon which rests the rear end of plough-beams when in use, and which gauges the lowest depth of furrow. There is also a double iron crank-shaft, M, resting upon the rear end of frame, with handle or lever N, which is used to lift the ploughs from the ground when not in use, and while passing to and from the field, by moving the lever back and fastening it beneath the catch $s$ at the right side of driver's seat. It also is used to regulate the depth of furrow of light plough, and of cultivator, and may be held in place by graduated catch-bar on side of driver's seat. To the double crank-shaft M are suspended two slings, Y Y, by means of chains $p\ p\ p\ p$, in which slings the plough-beams are held, and by which they are raised. I construct my ploughshares by bolting the blade to the arm, as represented in Figs. II and IV. Q Q are the blades, made of cast iron or steel; $q\ q\ q\ q$, the bolts; thus they are easily removed when worn out, and new ones substituted. My cultivator's blades are constructed in the same manner as is shown in Fig. IV.

In Fig. III, I exhibit my triple whiffle-tree, as it may be used in Fig. V. I I are two heavy spreads, to be attached to the flat chains H H, and are also united by the triple link $x$, to which also the single whiffle-tree 2 is attached. The single-trees 1 and 3 are attached to the extreme ends of the spreads by means of cold-shut links, and may be attached or detached at any time, and used when the machine is used as a cultivator, as shown in Fig. V. In my spreads I I, I put the eye-bolts which hook to the flat chains near the outer ends, so that I equalize the force and purchase, so that each of the three horses receives equal force, as is clearly shown in Fig. III.

Having thus fully described my "prairie-breaking plough and cultivator," what I claim as my invention, and desire to secure by Letters Patent, is—

1. My forward upright frame F, with swing-bar G and flat chains H H, for the use and purpose as specified and herein set forth.

2. The attaching of my pole to the centre, or near the left side of my machine, for the use and purpose as specified and herein set forth.

3. My triple whiffle-tree, with the triple link $x$, as represented in Fig. III, for the use and purpose as specified and herein set forth.

4. My crank-axles, as made, attached, and operated on my machine, for the use and purpose as specified and herein set forth.

5. My "compound regulating-shaft" X, with the revolving sockets $j\,j$, spring-lever K, and circle L, for the use and purposes as specified and herein fully set forth.

6. I claim the combination of my crank-axles, compound regulating-shaft X, and spring-lever, for the use and purpose as specified and herein set forth.

7. My double crank-shaft M, with lever N and slings Y Y, for the use and purpose as specified and herein set forth.

STEPHEN T. SKINNER.

Witnesses:
R. C. SKINNER,
JAMES H. HALLIBURTON.